(No Model.) 2 Sheets—Sheet 1.
W. CRAWFORD.
COMBINED AIR SIGNAL AND BRAKE PIPE COCK.
No. 538,187. Patented Apr. 23, 1895.
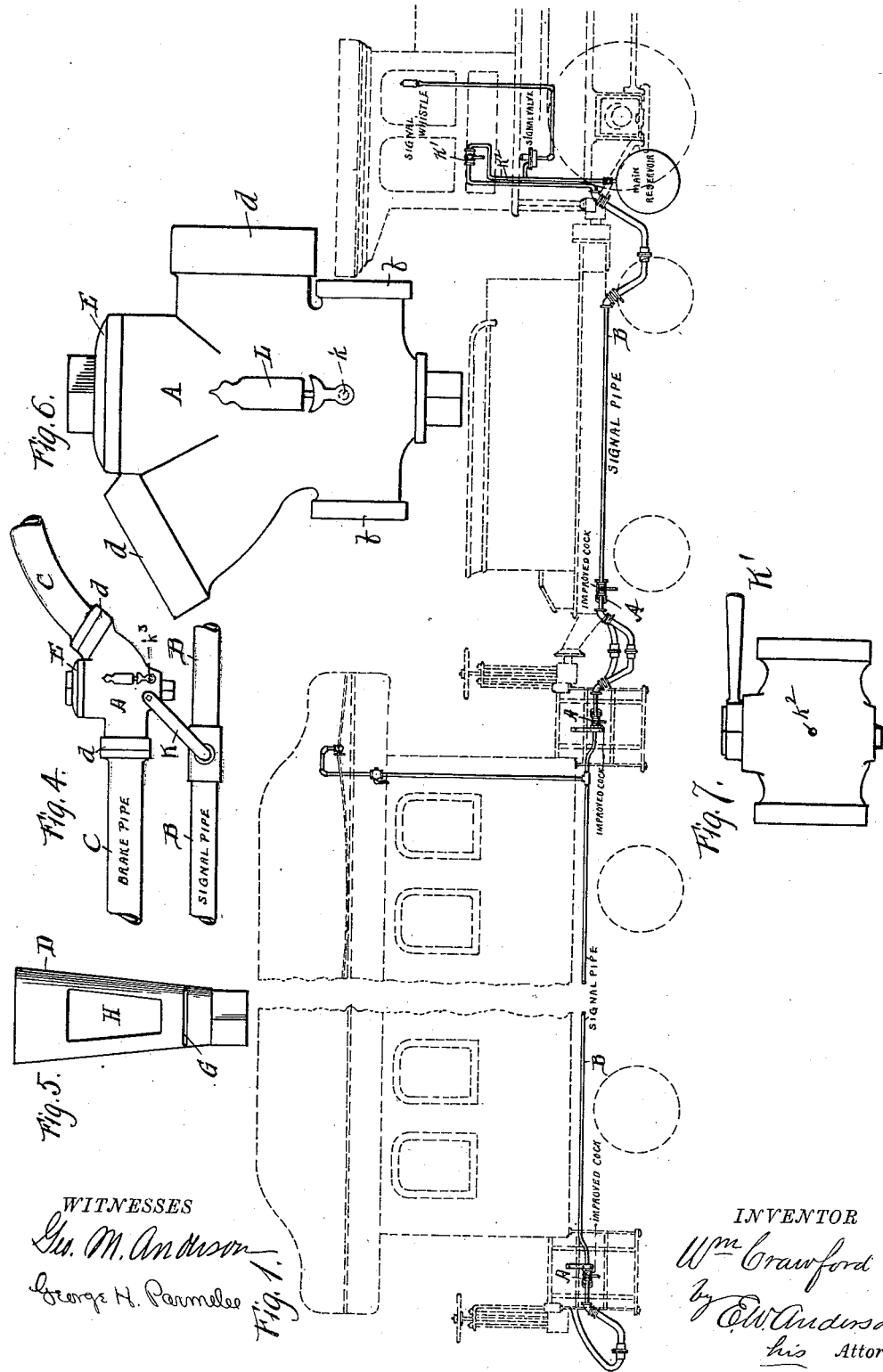
WITNESSES
INVENTOR
Wm Crawford
by E. W. Anderson
his Attorney

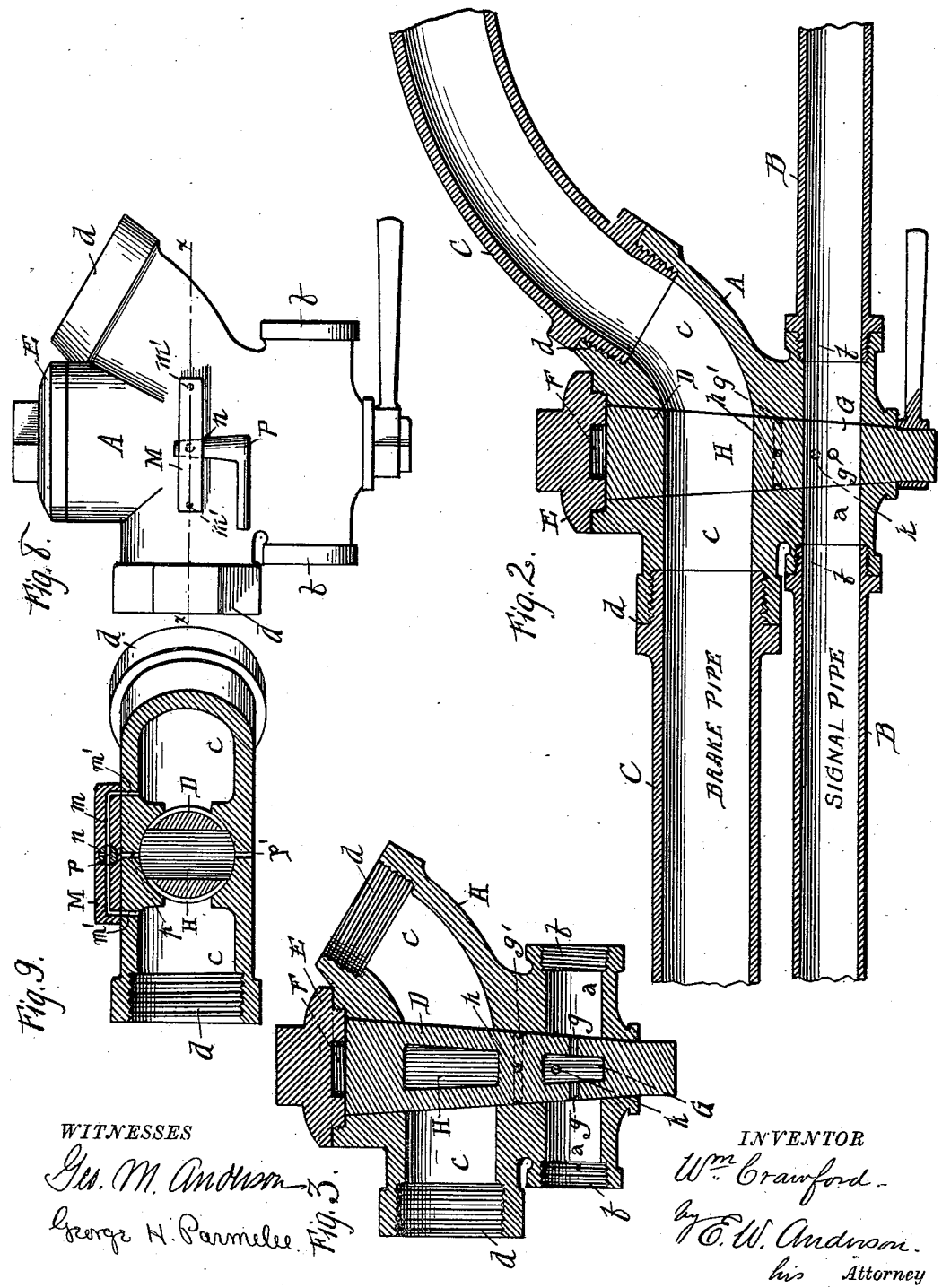

UNITED STATES PATENT OFFICE.

WILLIAM CRAWFORD, OF WINNIPEG, CANADA.

COMBINED AIR-SIGNAL AND BRAKE-PIPE COCK.

SPECIFICATION forming part of Letters Patent No. 538,187, dated April 23, 1895.

Application filed May 29, 1894. Serial No. 512,900. (No model.)

*To all whom it may concern:*

Be it known that I, WILLIAM CRAWFORD, a citizen of Canada, and a resident of Winnipeg, in the county of Selkirk and Province of Manitoba, Canada, have invented certain new and useful Improvements in a Combined Air-Signal and Brake-Pipe Cock; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a side view partly diagrammatic of the invention applied. Fig. 2 is a horizontal section through cock with ports open showing portions of the brake and signal pipes. Fig. 3 is a horizontal section through cock with ports closed. Fig. 4 is a plan view of modification. Fig. 5 is a detail of plug used in same. Fig. 6 is a bottom plan of cock showing whistle. Fig. 7 is a detail of angle cock in engineer's cab. Fig. 8 is a plan view of cock showing attachment for freight service. Fig. 9 is section on line $x$—$x$, Fig. 8.

This invention has relation to a combined air signal and brake pipe cock, designed for use in connection with the air brake and signal pipes commonly employed on railway passenger trains, the object being to provide means whereby the engineer will be automatically warned should the brake pipe, from any cause, be closed on any portion of the train.

With this object in view the invention consists in the novel construction and combination of parts, all as hereinafter described and pointed out in the appended claims.

In the system commonly employed on passenger trains, there is provided, in addition to the brake pipe, a signal pipe, which is supplied with air or other fluid pressure from a reservoir on the engine, the pipe extending throughout the train with a branch into each coach provided with an escape valve. The cab is provided with a whistle or alarm in connection with the signal pipe, such whistle or alarm being sounded by a reduction of pressure in the said pipe, which reduction is effected by opening the escape valve in any part of the train.

By the present invention I provide a cock designed to take the place of the ordinary angle cock on the coaches, and also on tender of engines, said cock being arranged to control both the signal and the brake pipe, the arrangement being such that if a cock in the brake pipe is closed in any part of the train, air is allowed to escape from the signal pipe, reducing the pressure therein and causing the engineer's whistle in the cab to sound, immediately notifying him that something is wrong. I may also provide each of my improved cocks with a whistle operated by the escape of air from the signal pipe whereby the trainman or brakeman will be at once notified if he has neglected to open any particular cock.

Referring to the accompanying drawings, the letter A designates the case or shell of my improved cock, which at one end portion is provided with a throughway $a$ and with couplings $b$, $b$ for the signal pipe B. At the opposite portion is a second throughway $c$ with couplings $d$ $d$ for the brake pipe C.

D designates the rotary tapered plug whose seat extends through the shell or casing at right angles to the throughways $a$ and $c$. The inner end of the seat is closed by a cap E, which also confines a spring F upon which the lower end of the plug seats. Said plug is formed near its outer end with a straight through-port G, and with a small port or passage $g$ at right angles to said port. Beyond the port G and in the same direction, is a second through-port H. When the cock is opened these ports G and H form a part respectively of the throughways $a$ and $c$, and permit a continuous passage of air through both the brake and signal pipes. Between the ports G and H the plug is formed with a circumferential groove $g'$, the purpose of which is to catch any air that might leak from one pipe to the other along the plug and pass it out through a small opening $h$ in the shell or case.

$k$ is a second opening in said shell or case which is adapted to register with the port G when the latter is turned to close, or partially close, the signal pipe.

It will be apparent that inasmuch as the ports G and H occupy the same relative position with relation to the brake and signal pipe, that should the brake pipe be closed by the plug, or not open to its full extent, the signal pipe will be in the same condition, bringing the port G opposite the small opening $k$, thus permitting the escape of air from the signal pipe, and sounding the engineer's whistle in the cab, so that the engineer is at once warned if any of the brakes throughout the train are cut out of operation. This may happen while the train is running, or by reason of the negligence of the brakeman in neglecting to properly set the cock in coupling. When the plug is turned to partially close the brake pipe, the escape to the opening $k$ will be through the port G, but when the cock is entirely closed, the escape is by way of the passage $g$ and port G.

L is a small whistle which is placed over the opening $k$ and is sounded by the escape of air therefrom, this feature providing an additional safeguard, which may however, be omitted. When this whistle is employed, should the angle cock accidentally get shut while the train is in motion, the escape of the air will give the engineer's whistle one long blast, after which it will not blow again, while the whistle L will blow continually as long as the engineer leaves air in the signal pipe.

In the cab, convenient to the engineer, I place an ordinary angle cock K', which, as shown in Fig. 1 is connected by branch pipes $K^2$ with the signal pipe and the engineer's signal valve. Through the shell or casing of this valve is a small hole or opening $k^2$, which bears the same relation to the port of the valve as do the openings $k$ to the ports G of the angle cock, so that by turning the cock one-eighth, air will escape from the signal pipe, causing the engineer's automatic whistle to blow.

If any of the combined cocks A should not be in proper position for running there will be no pressure in the signal reservoir to blow the whistle by reason of the fact that the air has escaped through that cock which is not in proper position. This cock K' will therefore provide means whereby the engineer can at any time test his brakes and whistle since, if upon the partial opening of this cock, his cab whistle does not blow, he is at once notified that something is wrong—either that the angle cocks are not properly set, or that the whistle is out of order. This cock is the only positive cut out on the signal pipe throughout the train.

In order that the openings $k$ may be covered on the cock A at rear end of train, and the cock left open, dummy couplings should be provided for the brake and signal pipes.

Fig. 4 illustrates a modification of the invention where the signal pipe instead of running through the cock, is connected therewith by a branch pipe K. In this construction, when the cock is shut the upper port G (which consists of a groove) of the plug is brought opposite the escape opening $k^3$, and air is permitted to escape from the signal pipe. To make this connection with the signal pipe it is only necessary to remove the ordinary cock therefrom and substitute therefor a T-coupling.

M, Figs. 8 and 9 designates an attachment for the cock which may be used for freight service. Said attachment is formed with a passage or channel $m$ therethrough which at its ends registers with small ports $m'$ $m'$ in the casing at opposite sides of the plug, and forming with said ports a passage around the said plug. Said attachment is provided at $n$ with a seat for a three-way cock P. In coupling up a train this three-way cock should be turned toward the rear of the train. Should the main cock be accidentally shut, air will flow into the three-way cock, thence through a small port $p$ into the main cock, through the port H, and out at a port $p'$ at the opposite side of the cock, thereby setting the brakes behind this point. In uncoupling the three-way cock is turned one-eighth, closing all its ports.

Having described my invention, what I claim as new, and desire to secure by Letters Patent, is—

1. The combination with the pressure pipe lines of a railway brake and signal system, said lines having no communication one with the other of one or more valves or cocks in connection with said pipes and having their valve plugs common to both the brake and signal pipe and an escape opening in said cock arranged to be brought into play when said cock is closed, said opening being for the purpose of permitting air to escape from the signal pipe to the open air substantially as specified.

2. In the brake and signal system of railway trains, the combination with the brake and signal pipes, of a cock arranged to control the brake pipe at each coach, and upon the tender, the valve plug of each cock being extended to also control the signal pipe at that point, and an escape opening from said cock arranged to be brought into communication with the signal pipe when said plug is turned to close the brake pipe, said opening being for the purpose of permitting air to escape from the signal pipe to the open air substantially as specified.

3. The combination with the pressure pipe of a railway brake and signal system, of a cock having a plug arranged to control the brake pipe and also the signal pipe, or a branch thereof, and an escape opening from said cock arranged to be brought into play when said cock is closed, said escape opening leading from the signal pipe to the open air substantially as specified.

4. The herein described combined brake pipe and signal pipe cock, comprising a shell or casing having two substantially parallel throughways, with couplings for connection with the brake and signal pipes, a plug seat at right angles to said throughways, a rotary plug seated therein, two ports through said plug arranged to register respectively with said throughways when the cock is open, and an escape opening through said shell or case with which one of the said ports is in communication when the cock is closed, substantially as specified.

5. The herein described combined brake pipe and signal pipe cock, comprising a case or shell having two substantially parallel throughways, with couplings for the signal and brake pipes, the plug seat at right angles to said throughways, the rotary plug in said seat, the ports G and H through said plug, and arranged to register respectively with the respective throughways the small opening or port $g$ at right angles to the port G, the escape opening $k$ in the case or shell, and adapted to be brought into communication with the port G when the cock is closed the circumferential groove in the plug intermediate of said ports G and H, the escape opening $h$, and a whistle or alarm over said opening $k$, substantially as specified.

6. The herein described combined brake pipe and signal pipe cock, comprising a case or shell, having two substantially parallel throughways, the plug seat, the rotary plug having the ports G, H, and arranged to register respectively with the corresponding throughways, the port $g$ at right angles to the port G, the escape opening $k$, arranged to communicate with said port G when the cock is closed the attachment having the port leading around said plug, the three-way cock controlling said port, and the opposite ports $p$ and $p'$ in the said shell or case, the port $p$ being in communication with the port in said attachment at the seat of the three-way cock, both the ports $p$ and $p'$ being in communication with the port H of the plug when the cock is closed, substantially as specified.

7. The combination on a railway train, with the brake and signal pipes, and the engineer's automatic whistle in the cab, of a cock on each end of each car arranged to control the brake pipe, a connection between said cock and the signal pipe, an escape opening in said cock arranged to be in communication with the signal pipe whenever the brake pipe is closed by said cock, and a cut off valve in the cab connected with said signal pipe, and also having an escape opening, substantially as specified.

8. In the brake and signal system of railway trains, the combination with the brake and signal pressure pipes, of a cock at each end of each car having its plug arranged to control both of said pipes, and common thereto, an escape opening from each of said cocks, and a pneumatically operated whistle over said opening, substantially as specified.

In testimony whereof I affix my signature in presence of witnesses.

WM. CRAWFORD.

Witnesses:
I. PITBLODO,
JAMES CRAWFORD.